June 11, 1957 C. H. AREND 2,795,101
SIDE DELIVERY RAKE
Filed May 31, 1955
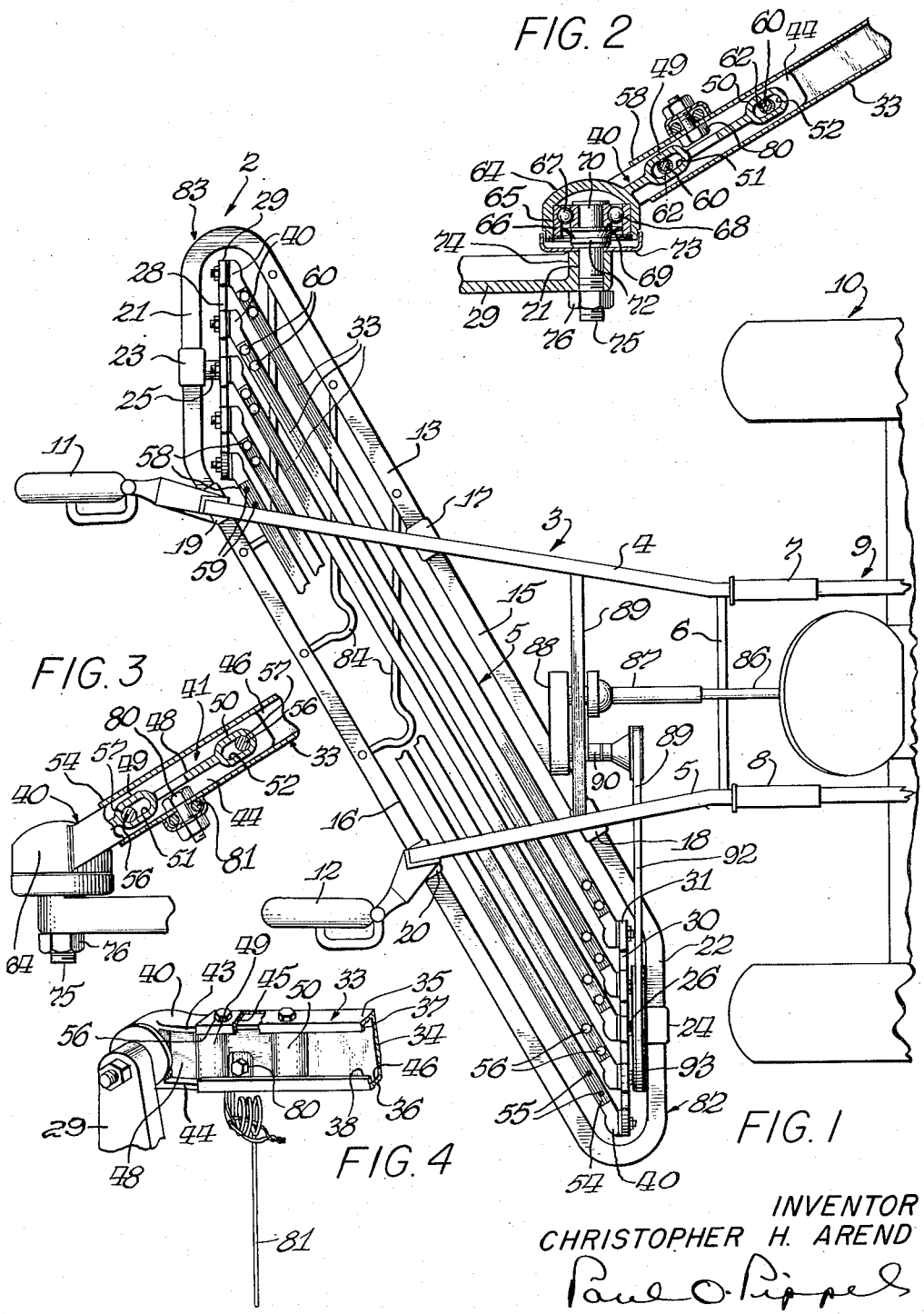
INVENTOR
CHRISTOPHER H. AREND
Paul O. Pippel
ATTORNEY United States Patent Office 2,795,101
Patented June 11, 1957

2,795,101

SIDE DELIVERY RAKE

Christopher H. Arend, Berwyn, Ill., assignor to International Harvester Company, a corporation of New Jersey Application May 31, 1955, Serial No. 511,947

7 Claims. (Cl. 56—377)

This invention relates to side delivery rakes and more specifically to the type commonly known as the parallel bar side delivery rake.

A general object of the invention is to provide such a side delivery rake which includes a pair of end spiders which are displaced axially and transversely and operate on generally parallel axes and the spiders being interconnected by tooth-carrying bars which are adapted to be rotated in parallelism about the aforementioned axes.

A more specific object of the invention is to provide a novel and improved connection between the bars and the respective spiders to provide for and compensate against out of parallelism and spacing of the axes of rotation of the spiders and the spacing of the axes of rotation of the connections of the ends of the bars with the respective spiders.

It will be understood that in rakes of the type under consideration it is prohibitively costly to try to arrange the axes of rotation of these spiders exactly parallel to each other, and insure that each point of connection between each spider and each bar is exactly equidistant from the center of the spider and that certain variations not only from the point of view of manufacture but also in assembly and so forth are absolutely necessary, and that when the axes of rotation of the two end spiders at opposite ends of such a parallel bar rake are not exactly aligned and the spacing of the journals between the spiders and bars is not exact it is impossible to merely journal opposite ends of the interconnecting tooth-carrying bars inasmuch as the differences between the points of connection as respect to the two spiders varies and the device will lock.

A further object of the invention is to provide a novel connection between each bar and at least one of the spiders which will lengthen and shorten in accordance with the spacing of the points of connection of the bar with the two spiders.

Another object of the invention is to provide a novel connecting member which is formed and arranged so that it can be bolted tightly to the bar or so bolted as to have longitudinal movement with respect to the bar.

These and other objects of the invention will become more apparent from the specification and drawings, wherein:

Figure 1 is a plan view of the novel rake incorporating the invention with portions of an associated tractor fragmentarily shown;

Figure 2 is an enlarged fragmentary horizontal sectional view of one end of the tooth bar and its slidable connection to an associated spider;

Figure 3 is a further sectional view comparable to that of Figure 2 but showing the mode of connection between the connecting member and the bar in fixed relationship to each other; and Figure 4 is a fragmentary side perspective view of the portion shown in Figure 3.

Describing the invention in detail, the rake generally designated 2 comprises a main frame structure 3 which includes a pair of fore and aft extending main beam members 4 and 5 which are interconnected adjacent to their forward ends by a transverse member 6 and the forward extremities of the members 4 and 5 are provided with connecting elements (not shown) which are adapted to socket within the hitch elements 7 and 8 of a hitch linkage generally indicated 9 which is associated and carried by the tractor 10. The hitch arrangement between the tractor and the rake is per se not essential to the invention and is therefore only incidentally described.

The rear extremities of the main beam members which are arched are connected to caster wheels 11 and 12, respectively, and said main beam members 4 and 5 carry intermediate their ends a rake frame 13 which comprises forward and rearward generally parallel beam members 15 and 16 which extend obliquely to the direction of travel of the rake and the front member 15 is connected intermediate its ends as by connecting members 17 and 18 to the beam members 4 and 5, and the rear member 16 is connected intermediate its ends as by connecting means 19 and 20 to adjacent the rear ends of the members 4 and 5. The rake frame 13 is provided with end members 21 and 22 which interconnect the respective ends of the front and rear rake frame members 15 and 16 and are disposed generally parallel to each other and approximately perpendicular to the direction of travel of the machine. The members 21 and 22 of the rake frame 13 carry bearings 23 and 24, respectively, in which are journaled stub axles 25 and 26 in substantially parallel relationship.

The stub shaft 25 projects forwardly of the tubular rear member 21 and at its forward end is connected to a driven rotary end member or spider 28 which has a plurality of outwardly extending spokes 29. Similarly the stub shaft 26 projects rearwardly of member 22 and the rear end of the stub shaft 26 journals a front end member or spider 30 which comprises a number of outwardly extending spokes or arms 31 equal to the arms 29. Between corresponding arms 29 and 31 of the rear and front end members 28 and 30 there extend rake bars 33 which are preferably C-shaped in cross section as best seen in Figure 4 and each comprising a vertical web 34, top and bottom flanges 35 and 36 which extend outwardly from one side of the wall 34 and the outer edges of top and bottom flanges 35 and 36 are provided with reentrant flanges 37 and 38 whereby flange 37 of the upper flange 35 extends downwardly therefrom, and the flange 38 of the web 36 extends upwardly therefrom.

A connecting member indicated 40 is disposed within each end of each bar 33.

The member 40 comprises an elongated I-section shank or body portion, generally indicated 41, which includes vertically spaced top and bottom substantially horizontal flanges 43 and 44 which provide top and bottom bearing surfaces adapted to engage with the inner sides 45 and 46 of the top and bottom flanges 35 and 36 of the beam member 33. It will be appreciated that the top and bottom webs 43 and 44 are substantially the width of the top and bottom flanges 35 and 36 and along their lateral edges are in guided engagement between the interior sides of the vertical walls 34 and the vertical flanges 37 and 38. The top and bottom flanges 43 and 44 of the shank portion are interconnected by a substantially vertical wall or web 48 which at longitudinally spaced points is provided with bosses or enlargements 49 and 50 which are formed with vertical apertures 51 and 52 which are elongated longitudinally of the shank portion 41 and thus of the bar 33. It will be seen from a consideration of Figures 1 and 3 that the forward ends 54 of the bars are provided in the top and bottom flanges 35 and 36 with apertures 55 for admitting the bolts 56 therethrough, said bolts passing through the slots 51 and 52 and the spacing of the apertures 55, 55 being such that the bolts 56 seat against the remote extremities or edges 57 of the slots 51 and 52 and thus prevent endwise movement of the member 40 with respect to the bar.

The trailing or rear extremities 58 of the bars 33 are provided with apertures 59 spaced longitudinally of the bar and disposed in the top and bottom flanges 35 and 36, and it will be seen that these apertures are spaced closer to each other than the related apertures 55 at the other end of the bar so that the bolts 60 which extend therethrough and through the apertures or slots 51 and 52 are substantially centered with respect to the respective slots in the normal position of the connecting means 40 so that said connecting means is accommodated movement lengthwise of the bar. The bolts 60 in the present instance may be of a smaller diameter than the bolts 56 and may be provided with rollers or separators 62 which may extend between the top and bottom flanges 35 and 36 in order to prevent their being drawn fast against the top and bottom sides of the shank of the associated connecting member 40.

The outer end of each connecting member is provided with a socket portion 64 which has a cylindrical bore 65 receiving snugly therein and keyed to an outer race 66 of a bearing which includes a series of balls 67 which operate in runways 68 of the outer race 66 and inner race 69. The inner race 69 is sleeved over a spindle or a shaft 70 and suitably connected thereto as by being riveted to the same and the shank 70 passes through an aperture 71 in an arm 29 or 31 which is disposed substantially parallel to the axis of rotation of the associated spider. It will be understood that there is enough tolerance in the bearing structure to accommodate for non-parallelism between the shafts 25 and 26 or out of plane disposition of the arms of the spiders. The shank 70 is provided with a collar 72 which abuts through a dust cap 73 against one side of the hub portion 74 within which is provided the beforementioned opening 71 and the outer end 75 of the shaft 70 is threaded therein and has a nut 76 threaded thereon which is drawn up against the opposite side of the related arm.

The bars 60 are connected as by bolts 80 to the upper ends of spring tines or teeth 81 which are adapted to rake the ground and deliver the crop from the leading end 82 of the rake to the trailing end 83 of the rake and the rake teeth 82 cooperating with stripper bars 84 which are connected between the front and rear members 15 and 16 of the rake frame structure 13, as will be already understood by those skilled in the art.

The rake reel generally indicated 85 is driven from the power take-off 86 of the tractor and the drive is continued into a telescoping shaft 87 and from there through a gear box 88 which is carried on a transverse member 89 connected to the main frame members 4 and 5, and from there the drive proceeds through a countershaft 90 which is keyed to a pulley 91 which drives a belt 92 which drives a pulley 93 which is connected to the shaft 26.

What is claimed is:

1. A side delivery rake comprising a pair of rotatable end members having parallel axes of rotation laterally and axially displaced from one another, a rake bar element having connections at opposite ends with respective end members effective to hold the rake bar element against rotation about its axis while moving bodily with the end members about the axes of the end members, the connection of the rake bar element with one of said end members comprising a connecting element disposed in endwise extension to the rake bar element, lost-motion means interconnecting said elements and accommodating relative movement therebetween lengthwise of said rake bar element, and including abutting surfaces on said elements disposed in opposing overlapping relation transversely of the rake bar element and in slidable engagement with each other lengthwise of the rake bar element, said surfaces formed and arranged to hold said elements against rotation about the axis of said bar.

2. A slide delivery rake comprising, in combination a pair of rotatable end members having parallel axes of rotation laterally and axially displaced from one another; a plurality of rake bar members having connections at opposite ends with respective end members restraining said bar members against rotation about their own longitudinal axes and constraining them to move bodily in a closed path defined by rotation of said end members; the connection of each rake bar member with one of said end members comprising a spindle operatively mounted on said one end member and having its longitudinal axis disposed generally parallel to the rotational axis of said one end member, an elongated connecting element having an operative connection with said spindle at one end and having an opposite end portion disposed in overlapping relation to an adjacent portion of said rake bar member, a plurality of bolts extending through transverse aligned apertures in said portions, the apertures in one of said portions being elongated longitudinally of the rake bar member to accommodate relative sliding movement between said element and said rake bar member.

3. For use in a device of the class described a channel-shaped rake bar member having spaced flanges and an interconnecting wall, identical connecting elements at opposite ends of the bar for connecting the bar to associated rotor structures, each element comprising a shank portion telescoped between the spaced flanges of the bar, said shank portion having apertures therethrough elongated lengthwise of the bar and said top and bottom flanges at each end of the bar having apertures registering with the said apertures in the adjacent element shank portion, bolts extending through registering apertures in each element and flanges in the related end of the bar, the apertures at one end of the bar being spaced lengthwise of the bar a lesser distance than the lengthwise span between the remote extremes of the apertures in the shank portion telescoped within said end whereby providing a lost-motion connection with the associated bolts accommodating sliding movement of the connecting element with respect to the bar, and the apertures at the opposite end of the bar being spaced such distance apart as to align with the remote extremities of the apertures in the related element shank portion whereby the bolts associated therewith abut against the portions of the shank portion defining the extremes of said apertures therein and thereby locking said element with the bar against endwise movement.

4. For use with a rake of the type described, a channel-shaped rake bar having top and bottom flanges and an intervening vertical wall, a connecting element having a shank portion disposed within one end of said bar and having top and bottom substantially planar surfaces opposing said top and bottom flanges, said shank portion having two vertical slots therethrough spaced lengthwise of said portion and elongated longitudinally of the bar, said top and bottom flanges each having a pair of apertures therethrough registering with respective slots and spaced longitudinally of the bar a distance less than the distance between the remote extremities of said two slots, a spacer extending through each slot and having opposite ends bearing against said flanges, and bolts extending through registering apertures, slot and spacer, said spacers preventing drawing up of the bolts and said flanges against the top and bottom sides of the shank portion whereby said element is accommodated by lengthwise movement relative to the bar.

5. A side delivery rake comprising driving and driven rotary end members having parallel axes laterally and axially displaced from each other, a plurality of rake bar members, means connecting opposite ends of said rake bar members with respective end members restraining said bar members against rotation about their own longitudinal axes and constraining them to move bodily in a closed path defined by rotation of said end members, said means connecting each said rake bar member with one of said end members having a fixed relation to the bar member for longitudinal movement therewith and having a rotary relation with said one end member on a fixed axis axially offset and generally parallel to the rotational axis of said driving member, and the means connecting each rake bar member with the other end member having a lost-motion relationship therewith for longitudinal movement relative thereto and having a rotary relation to said driven member on a fixed axis axially offset and generally parallel to the axis of rotation of said driven member and each said last-mentioned means including telescoping portions on the said rake bar member and said other end member and presenting surfaces disposed in opposing relation transversely of the rake bar member and in slidable engagement with each other axially of the bar member and having interlocking engagement with each other circumferentially of the bar member for resisting rotation of the bar member on its individual axis.

6. In a parallel bar side delivery rake, the combination of a pair of end members rotatable on generally parallel laterally and axially displaced axes, a rake bar extending therebetween, means connecting each end of the rake bar to the adjacent end member on an axis displaced from and generally parallel to the axis of rotation of the end member restraining said rake bar against rotation about its own longitudinal axis and constraining it to move bodily in a closed path defined by rotation of said end members, at least one of said means comprising a connecting element having a portion disposed in overlapping relation to a portion of the related end of the rake bar transversely thereof, and means slidably interconnecting said portions for relative movement lengthwise of said rake bar.

7. In a device of the class described, the combination of a rake tooth bar having first and second end portions, identical first and second connecting elements at opposite ends of said tooth bar and having mounting portions disposed in telescoping relation respectively with said first and second end portions of the tooth bar, each end portion and mounting portion telescoped therewith having transversely aligned apertures, the apertures in said mounting portions elongated lengthwise of the rake tooth bar, bolts extending through the aligned apertures, the apertures in said first end portion being spaced a distance less than the distance between the remote extremities of the apertures in the connecting portion of the related element to accommodate movement therebetween lengthwise of said tooth bar, and the apertures in the second end portion disposed in alignment with the extremities of the apertures in the adjacent end portion for abutment by said bolts therein to restrain endwise movement of the tooth bar and the element.

References Cited in the file of this patent
UNITED STATES PATENTS 2,621,465    Klemm _____ Dec. 16, 1952